Sept. 29, 1953 F. H. MUELLER 2,653,791
VALVE
Filed April 27, 1951 5 Sheets-Sheet 1

INVENTOR:
Frank H. Mueller,
BY Cushman, Darby & Cushman
ATTORNEYS

Sept. 29, 1953     F. H. MUELLER     2,653,791
VALVE
Filed April 27, 1951     5 Sheets-Sheet 2
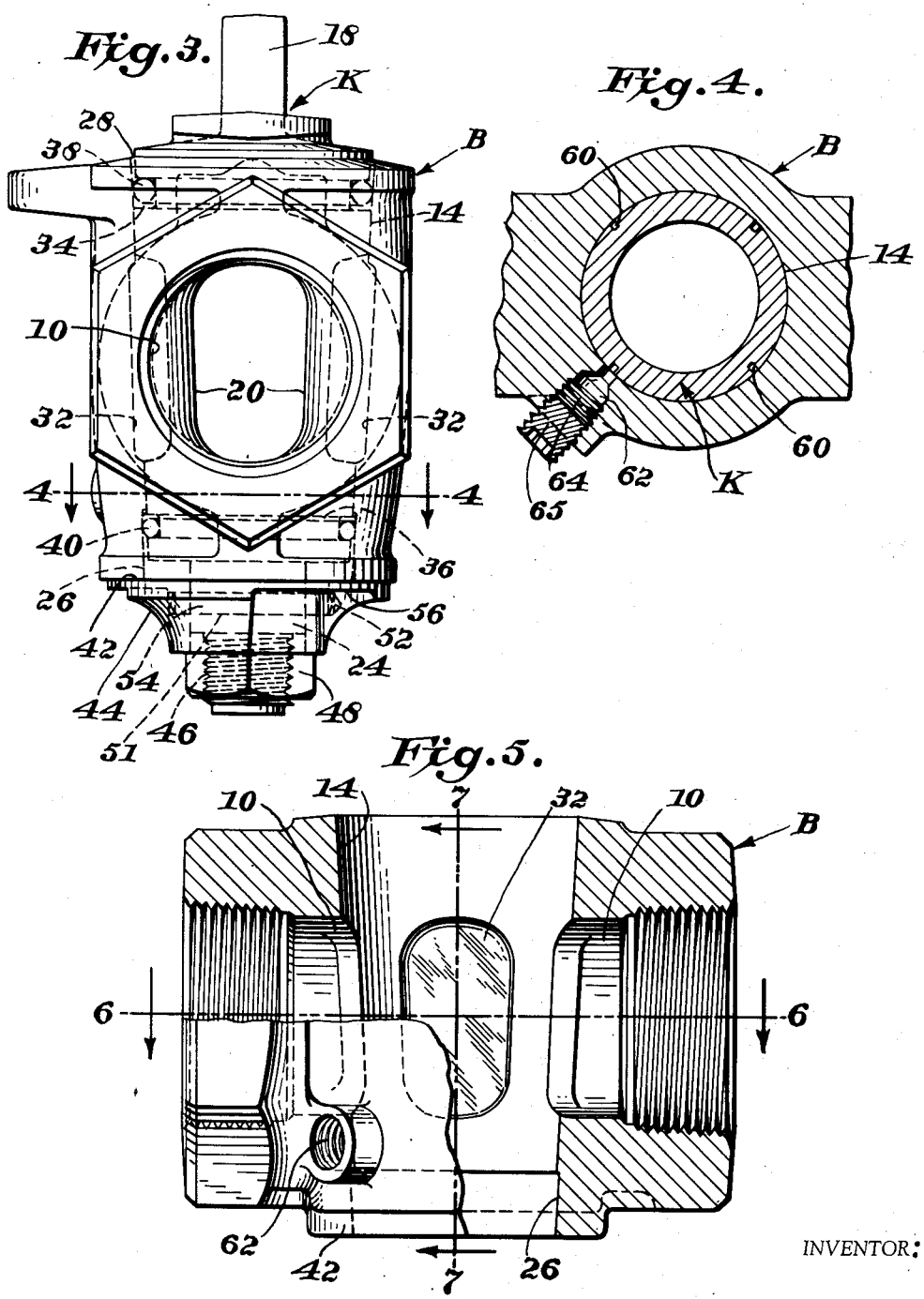
INVENTOR:
Frank H. Mueller,
BY Cushman, Darby & Cushman
ATTORNEYS Sept. 29, 1953 F. H. MUELLER 2,653,791
VALVE
Filed April 27, 1951 5 Sheets-Sheet 3

INVENTOR:
*Frank H. Mueller,*
BY *Cushman, Darby & Cushman*
ATTORNEYS.

Sept. 29, 1953        F. H. MUELLER        2,653,791
VALVE
Filed April 27, 1951        5 Sheets-Sheet 4
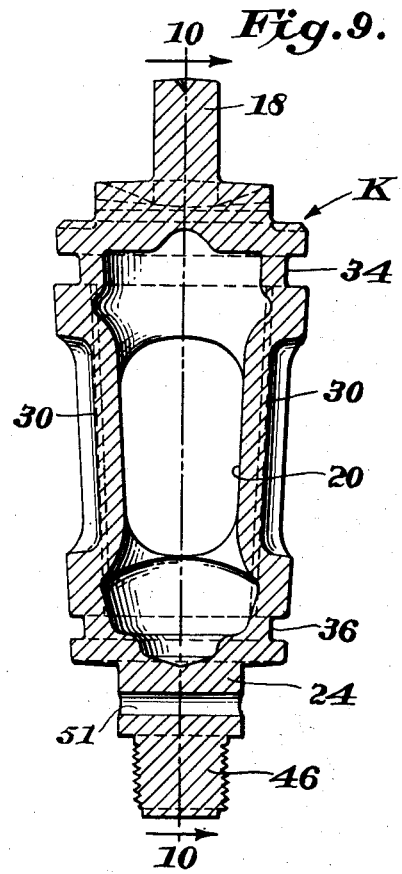
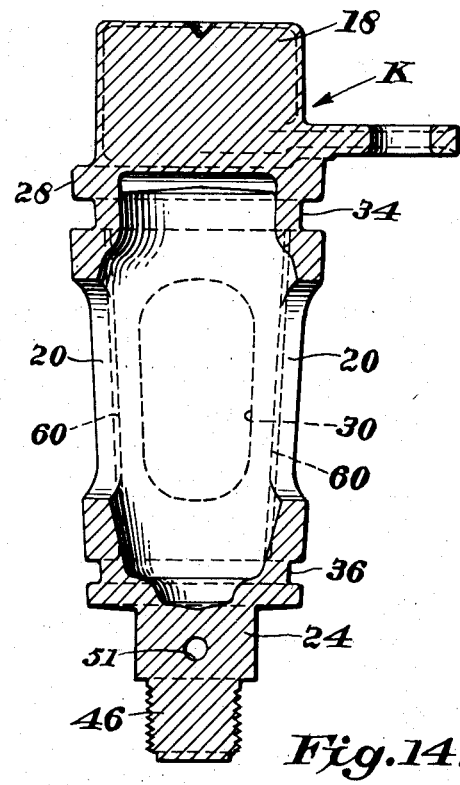
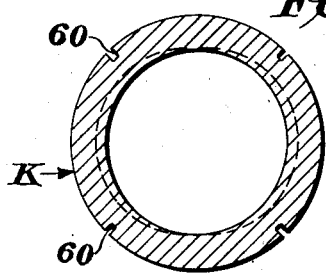
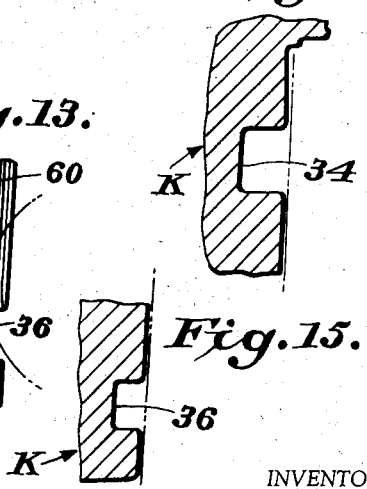
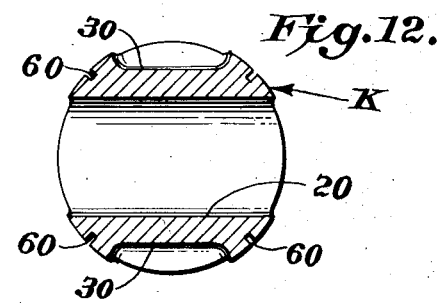
INVENTOR:
Frank H. Mueller,
BY Cushman, Darby & Cushman
ATTORNEYS.

Sept. 29, 1953  F. H. MUELLER  2,653,791
VALVE

Filed April 27, 1951  5 Sheets-Sheet 5

INVENTOR:
Frank H. Mueller,
BY Cushman, Darby & Cushman
ATTORNEYS.

Patented Sept. 29, 1953

2,653,791

UNITED STATES PATENT OFFICE 2,653,791

VALVE

Frank H. Mueller, Decatur, Ill., assignor to Mueller Co., Decatur, Ill., a corporation of Illinois Application April 27, 1951, Serial No. 223,228

19 Claims. (Cl. 251—93)

The present invention relates to valve means for controlling fluid under pressure in a system, and in particular, for controlling the flow of fluid under pressure in such as a pipe line. A principal object of the invention is to provide a valve of the rotating plug type of simple and inexpensive construction, having end sealing means which is automatically maintained in pressure-tight position or condition.

Another object of the invention is to provide such a valve having end sealing means which is tightened by the pressure exerted thereon by any fluid from the line which may escape outwardly between the engaging surfaces of the valve member and its seat.

Another object of the invention is to provide a valve of the plug type having end sealing means which is held tightened in its most efficient sealing position by an enclosed lubricant system under pressure incorporated in the valve structure.

The present invention provides a plug type valve adapted to be mounted in a fluid line, having mechanical end sealing means in the form of a packing ring surrounding the major portion of the plug, and a closed system for lubricant under pressure interposed between the mechanical sealing means and the fluid line, the lubricant in the system being in contact with the packing ring to deform the latter to an extent necessary to make more effective its sealing function.

Another object of the invention is to provide a valve of the tapered plug type having appropriate relieved portions between the surfaces of the valve member and its seat permitting accurate grinding of the valve member to its seat without forming shoulders on the surfaces, with sealing rings between the surfaces adjacent the inner ends of the relieved portions thereof. It is an object of the invention to provide a valve of the type referred to, which has the sealing means incorporated between the engaging surfaces of the valve member and the body member of the valve structure, making unnecessary the incorporation of special seals at the ends of the valve structure, such special seals being commonly placed around the valve stem or against the large end surfaces of the valve member and the body.

It is an object of the invention to provide a valve structure of the kind referred to, in which the plug may be inserted into the seat of the body member and tightened and secured in its proper position therein, the lubricating system for the surfaces between the members being filled after the valve member is thus positioned and properly adjusted in its seat.

A further object of the invention is to provide end sealing rings between the engaging surfaces of the valve member and the body member, which are deformed to most effective sealing position or condition by lubricant under pressure after the valve member is inserted and adjusted in the seat of the body member.

Another object of the invention is to provide a valve structure comprising a valve member and seat in the valve body, which have a central zone where the engaging surfaces of the valve member and its seat are in intimate contact, and end sealing rings between the valve member and the seat, together with tamper-proof means for securing the valve member in the body with the surfaces of the central zone in intimate contact with one another. Ancillary to this objective, it is a purpose of the invention to provide such an arrangement wherein the means for fixing the valve member in its seat permits slight axial movements of the valve member to tighten or loosen same, without disturbing the effectiveness of the end seal provided between the surfaces of the valve member and its seat.

Various other objects and advantages of the invention will be apparent as the description herein progresses.

In the drawings:

Fig. 3 is an end elevation of the valve.

Fig. 4 is a fragmental, transverse sectional view taken on line 4—4 of Fig. 3.

Fig. 5 is a vertical, longitudinal section through the valve body, partly in elevation.

Fig. 9 is a vertical transverse sectional view taken on line 9—9 of Fig. 8.

Fig. 10 is a vertical longitudinal sectional view taken on line 10—10 of Fig. 9.

Fig. 11 is a transverse sectional view taken on line 11—11 of Fig. 8.

Fig. 12 is a transverse sectional view, taken on line 12—12 of Fig. 8.

Figs. 13, 14 and 15 are enlarged fragmental detailed sectional views of the lubrication feed grooves.

Figure 1:
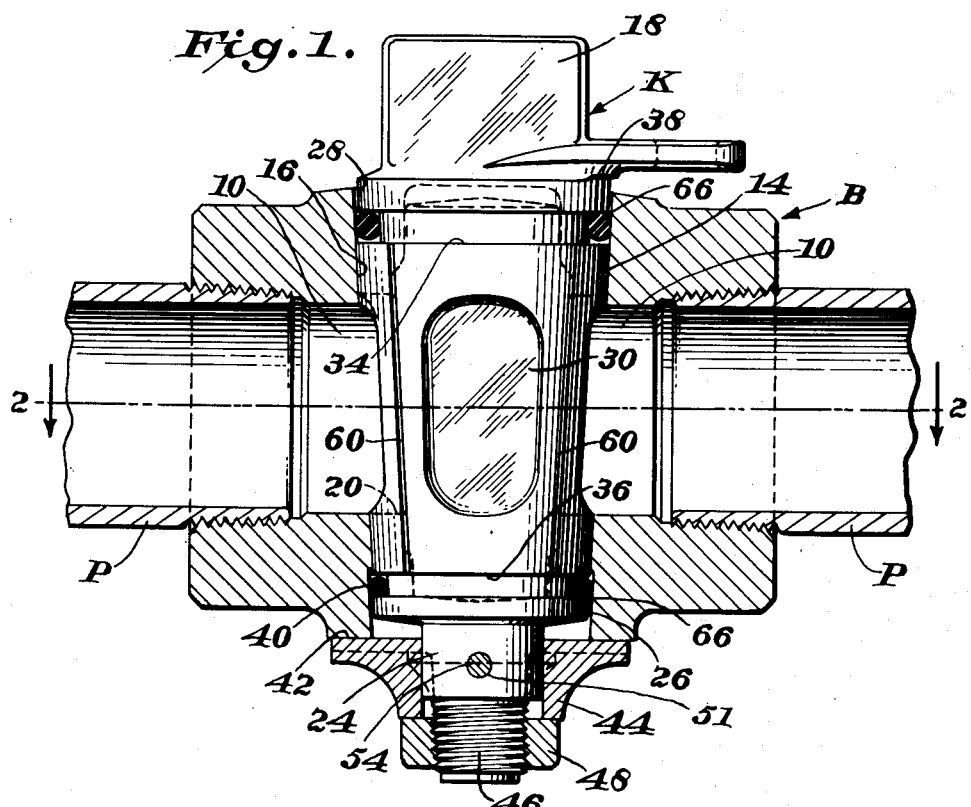
Fig. 1 is a vertical, longitudinal section through the valve assembly.

Referring to Fig. 1, the structure comprises a valve body or casing B, and a valve member or key of the plug type, generally designated as K. The body has a passage extending therethrough constituted by the openings 10, the outer ends of which are threaded, as is usual, for connection with other parts of the system being controlled, such as the ends P of sections of a pipe line. Of course, other means of connection may be employed, such as flange connections.

Figure 2:
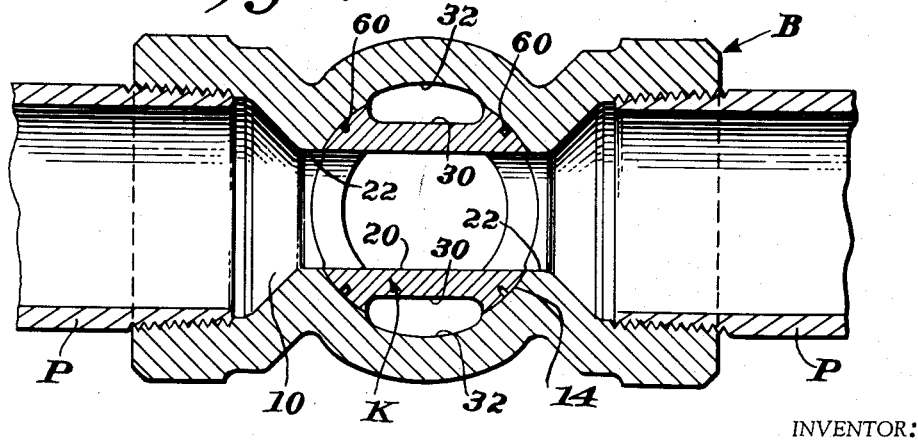
Fig. 2 is a horizontal sectional view taken on line 2—2 of Fig. 1.
Figure 6:
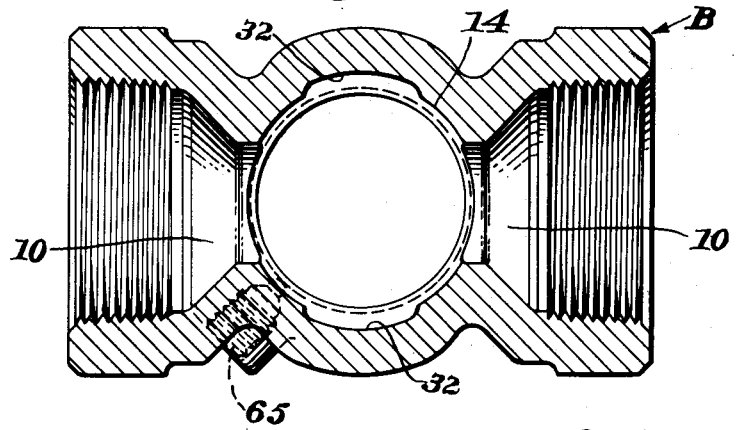
Fig. 6 is a horizontal sectional view taken on line 6—6 of Fig. 5.
Figure 7:
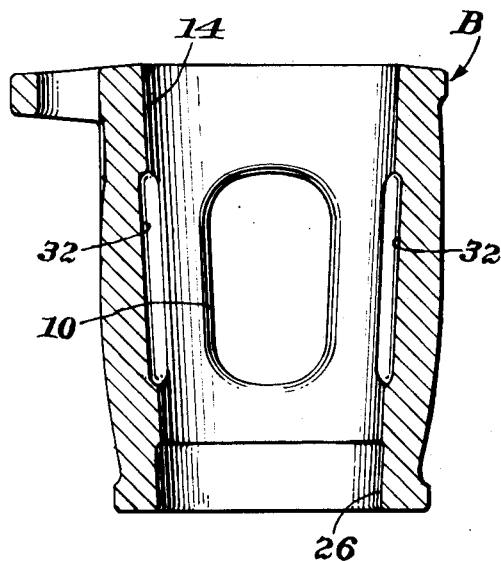
Fig. 7 is a transverse sectional view taken on line 7—7 of Fig. 5.
Figure 8:
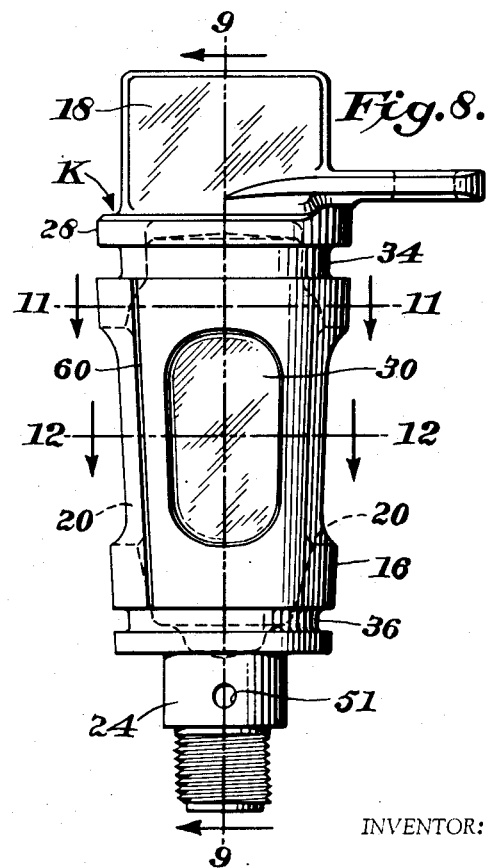
Fig. 8 is a side elevation of the valve key.

Extending laterally through the body is a tapered valve seat 14. The valve member comprises a major or principal portion, which is exteriorly tapered as at 16 to be received in the tapered portion of the body, and a reduced operating extension 18, as is usual in valve structures of this general type. The lateral opening through the body which forms the tapered seat extends entirely through the body and across the flow passage therethrough. The tapered major portion of the valve member has a port 20 extending therethrough, this port having straight side walls as shown in Fig. 2 which align with straight side wall surfaces 22 of the body when the valve member is turned to its open position.

At the lower end of the valve member, beyond the major or principal part thereof, there is a lower reduced extending valve stem 24, providing means for securing the valve member or key in the body or casing, as hereinafter described. The major or principal portion of the valve member is that tapered portion which extends between the lower valve stem 24 and the upper operating extension 18.

The port 20 is of a height substantially equal to that of the inner ends of the passage 10, and the exterior surface of the valve member and the interior surfaces of the body seat above, below and on each side of the port 20 and the passage 10 are ground to one another, each valve member to its particular body member, so that there is a central zone surrounding the port and passages where the respective surfaces are in intimate contact with one another when the valve member is adjusted and fixed in its proper seating position, in its seat.

The engaging surfaces of the valve member and seat are relieved at opposite ends of the valve, whereby said surfaces have end zones where they are slightly spaced from and out of contact with one another. For instance, the lower end of the seat, at the smaller end of the valve member, is relieved or bored out to a slightly greater diameter, as at 26, as compared with the tapered valve member engaging seating surface of the body immediately above the surface 26, and this relieved portion 26 extends outwardly to the end of the opening through the body. Similarly, at the opposite end of the structure, the exterior surface of the plug is relieved or reduced in diameter as at 28, as compared with the central engaging portion of the exterior of the plug, immediately below the relieved portion 28.

It will be understood that the seating surface of the body and the cooperating seating surface of the main portion of the valve member, are of conical formation. The conical surface of the valve member is interrupted by the opposite ends of the ports 20, and also by intermediate false or blind ports 30 which are generally of the same configuration as the ports 20 in cross-section. These blind ports in the plug are adapted to be aligned with similarly shaped recesses 32 in the seating surfaces of the body, at the opposite sides thereof, as shown in Fig. 2. The blind ports and recesses reduce the total area of the metal to metal contact between the valve member and its seat, thus reducing the resistance to the turning of the valve, and the body recesses are presented to the valve member ports when the valve is open, so that there is no corrosion of any ground surface due to gas trapped in the port.

At the opposite ends of the seating surfaces (shown formed in the exterior of the valve member or key) are circumferential grooves 34 and 36, of substantial depth. In these grooves are endless packing rings of deformable flexible material 38 and 40, the rings being of general circular cross-section made of solid rubber of a synthetic composition which is very dense and yet possesses great liveliness and elasticity. Such rings are now well known in the art, and may be purchased for various uses. The upper groove 34, and its ring 38, are slightly larger than the lower groove 36 with its ring 40. Each ring is slightly less in diameter, than its groove, in a direction longitudinally of the plug, and each ring is of somewhat greater diameter than the depth of its respective groove, whereby when the valve member or key is inserted in the body, as in Fig. 1, the ring is compressed between the bottom surface of the groove and the opposed surface of the body member of the valve. Thus, end seals are formed between the exterior surface of the valve member and the interior surface of the body member, as a result of the simple act of inserting the valve member or key into the seat of the body member. The grooves 34 and 36, and the rings 38 and 40, are positioned to surround the major portion of the valve member or key, and they are disposed between the engaging surfaces of the valve and body members. This arrangement distinguishes from conventional valves of the prior art, employing seals arranged beyond the major portion of the valve member or key, such as in a position surrounding the valve stem, or in a position at the end of the valve member or key covering or contacting the relatively large end surfaces of the main portion of the key and/or the end surface of the valve body or casing.

As stated, the particular body and key are ground to one another, during the manufacture of the valve structure, so that each key is especially formed or fitted for intimate contact with its particular body at the central zone of the engaging surfaces surrounding the port of the valve member and the passage of the valve body. In the embodiment of Fig. 1, the sealing rings 38 and 40 are stretched around the main portion of the valve member, and then permitted to relax into the grooves 34 and 36, prior to the insertion of the ground valve member or key into the ground seat of the body. Thus, the seals are completed merely by the act of inserting the valve member or key into the body, as distinguished from making up special seals around the end of the key or valve member after same is inserted in the body member, as is a common practice with prior art valve structures.

As shown in Figs. 1 and 3, the lower end of the casing is formed with a short circular extension 42 having a flat bottom face, and an annular locking ring 44 is provided surrounding the reduced valve stem portion 24. The valve stem has a further depending extension 46, which is threaded to receive a securing nut 48. The securing nut 48 engages the lower face of the ring 44, and the latter engages the face of the extension 42 on the body surrounding the lateral opening extending through the body.

When the plug or key is inserted into the body, after the key and body are ground to intimately fit one another, as previously referred to, and after the packing rings 38 and 40 are placed in their grooves, the locking ring 44 and the nut 48 are applied, and the nut is tightened by a wrench with the valve body held in a vise until the surfaces of the valve and body members are in the desired intimate contact in the central zone thereof.

With the construction as described, it is possible to accurately control the degree to which the valve member is tightened into the body, so that the exact optimum or desired contact condition between the members is achieved. Due to the fact that the packing rings 38 and 40 will protrude beyond the surface of the valve member, when the latter is inserted into its seat, there is a yielding engagement between the members, which is apparent in the relative ease with which the nut 48 may be tightened, as the valve member is drawn into its seat. When the surface of the valve member contacts the surface of the seat in the body, there is a pronounced change in the resistance to the turning of the nut 48, and this will be immediately felt by the person handling the wrench tightening the nut 48. The turning of the nut 48 can then be discontinued or a short partial additional turn may be given, as desired, and the wrench may then be applied to the upper operating extension 18 to determine if the key is properly adjusted in its seat to turn with just the proper resistance therein.

Figure 19:
Fig. 19 is a detailed elevational view of the locking pin.
Figure 20:
Fig. 20 is a detailed transverse cross-section of the locking pin of Fig. 19.
Figure 17:
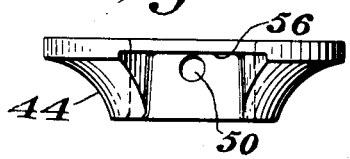
Fig. 17 is a detailed side elevation of the locking ring of Fig. 16.
Figure 18:
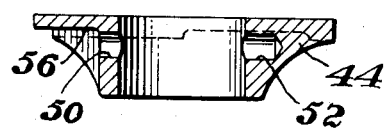
Fig. 18 is a further detailed sectional view on line 18—18 of Fig. 16.

At this time, and referring to Figs. 3, 17 and 18, a lateral hole 50 is drilled through the depending flange of the locking ring 44, and centrally and laterally through the reduced valve stem 24, to a point 52 in the opposite side of the locking ring short of complete penetration of this ring. Thereafter, a steel pin 54 of a design such as shown in Figs. 19 and 20 is driven through the hole 50, this pin being of such diameter as to fit tightly in the drilled hole, to lock the valve stem in fixed position within the ring 44. The pin 54 is driven completely home in the opening 50, by using a suitable hammer against the outer end thereof. Referring still to Fig. 3, the outer end of the pin 54, which may be mushroomed due to hammering, is disposed below the lateral opening through the valve casing, rather than below the lower surface of the extension 42 of the casing, so that any resulting distortion of the locking ring, upwardly, will not affect the accurate engagement of the upper face of the locking ring against the lower face of the extension 42.

Figure 16:
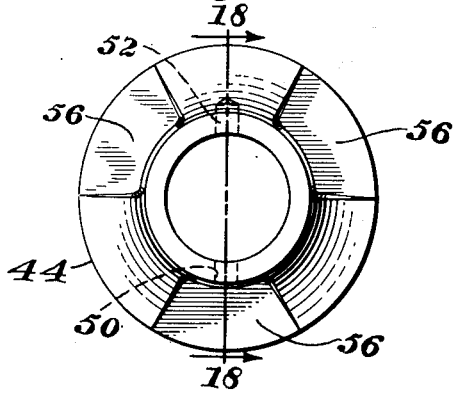
Fig. 16 is a detailed bottom view of the locking ring.

Referring again to Figs. 16, 17 and 18, it will be noted that the depending lower portion of the locking ring 44 is formed with three circumferentially spaced cut-outs 56 beneath its upper engaging flange leaving intermediated thick positions opposite each cut-out, so that the outer end of the locking pin may be driven inwardly to an extent where its distorted outer end, due to hammering, is beneath the opening through the casing, rather than beneath the lower surfaces of the extension 42 of the casing.

With the valve member thus fixed in adjusted position, during normal use of the valve, the plug may be turned by a wrench applied to the extension 18, and the locking ring 44, as well as the nut 48, will be turned with the valve member, during normal use. During normal operation of the valve there will be no tendency to loosen the nut 48.

Although the valve member is thus fixed in its adjusted position in the body, it is possible, within limits, to regulate the degree of tightness of the valve member on its seat. If it is found, after some use, that the valve should be tightened in its seat, a wrench can be applied to the nut 48 to turn same, and this turning movement will be resisted by the locking pin 54. However, this pin, made of steel, has some yielding capabilities, and will bend slightly to permit some tightening of the valve member against its seat. For example, authorized persons may give the nut about one sixth of a turn to thus move the plug longitudinally perhaps about 0.01" within the ffexibility of the pin 54. The steel pin will prevent such excessive tightening of the nut as would cause the valve member to bind in its seat or distort the valve member. The pin 54 is positioned to take the primary stress of the nut 48 while protecting the other parts even to the point where the threads of the nut are stripped.

If it is found, during use, that the valve member is too tightly held against its seat, the nut 48 may be loosened, and a tapping blow applied to the lower end of the valve stem 46, to loosen the valve member in its seat, to a slight extent. Here again, the primary stress due to this tapping will be absorbed by the steel pin 54, but this pin may be bent to a sufficient extent to allow some loosening of the valve member.

It will be noted that the means for adjusting and securing the valve member in its seat, is of a tamperproof nature. Because of the relation of the protruding sealing rings to the central engaging surfaces between the valve member and seat, an accurate desired adjustment of the valve member on its seat may be initially secured, when the valve is sold or when installed. While the valve member is fixed in a tamperproof manner in its adjusted position, there is capability, as described, of further adjustment within reasonable limits, limited by the pin 54, which protects the valve member against distortion due to too tight an adjustment, as well as the assembly against unauthorized removal of the valve member or such loosening of the same as would impair the effectiveness of the end seals. The adjustment by authorized persons within the limits referred to, have been found not to impair effectiveness of the end seals.

At the same time, the valve is self-protecting against unauthorized tampering, which might destroy the effectiveness of the end seals. For instance, it has been found that there is no serious or permanent impairment of the functioning of the valve, even when the nut 48 is tightened to a point where its threads are stripped. Similarly, it has been found that the end seals are still effective, even though the nut 48 is loosened, and after very hard hammer blows are applied to the end 46 of the valve stem.

As shown in Figs. 1, 2 and 4, the inner ends of the grooves 34 and 36 are connected by four equally spaced longitudinal channels 60 which interrupt the engaging surfaces of the valve member and seat, in the central zone of the valve structure. These channels are shown cut or formed in the external surface of the valve member, in the central zone thereof. They form, with the circumferential channels formed by those portions of the grooves 34 and 36 within the packing rings 38 and 40, a closed lubricant system which completely surrounds the opposite ends of the port 30 and the passage 10, in any of the closed or open positions of the valve. As shown for instance in Fig. 4, there is a charging port 62 extending through the wall of the valve casing, and the reduced inner end of this port is positioned for alignment with any one of the channels 60, depending on the adjusted position of the valve member, in open or closed position. Of course, with the construction shown, the port 62 does not align with any of the channels 60 when the valve member is in such an intermediate position that one of the channels 60 might be exposed toward either end of the passage 10.

The outer end 64 of the enlarged part of the port 62 is provided with interior pipe threads, i. e., threads of a tapered nature, to receive a plug 65 similarly threaded which is used to close the port 62, and to thus close the lubricant system in such manner as to tightly seal the same, precluding any leakage outwardly through the port 62. The plug inserted in the threaded portion 64 of the port 62 is used to charge the lubricant system, by forcing lubricant inwardly through any aligned channel 60, and into the inner ends of the grooves 34 and 36.

An important feature of the invention is the arrangement wherein the valve may be lubricated after the valve member is secured and adjusted in its seat, as previously described. When the engaging surfaces of a valve member and seat are lubricated, even partially, prior to the insertion and adjustment of the valve member in its seat, it is more difficult to determine when the valve member is properly adjusted to the desired engagement with its seat.

With the present construction, the valve member may be inserted and fixed in its seat, as previously described, with the engaging surfaces unlubricated and dry, so that it is possible to determine by the resistance to turning movement of the valve member, just when the desired optimum condition of adjustment is attained. Thereafter, and with the pin 54 driven home to fix the valve in adjusted position, a quantity of lubricant is placed in the port 62, and the charging plug is then threaded into the outer threaded end 64 of this port, thus forcing the lubricant into the closed system. When the charging plug is threaded inwardly, the lubricant passes into the aligned channel 60, and then flows upwardly and downwardly in this aligned channel as pressure is applied. This lubricant, such as grease, when it reaches the ends of the aligned channel 60, enters the space in the grooves 34 and 36 inwardly of the packing rings, and flows around these rings, entering the other channels 60 and thence flowing inwardly to fill these channels until the closed system is entirely filled with the lubricant. Thereafter, upon further application of pressure, by the charging plug, the lubricant in the closed system exerts an outward pressure on the packing rings 38 and 40, generally forcing them toward the outer ends of their grooves, and outwardly toward the engaging surfaces of the valve seat. The packing rings of the O-ring type are by this pressure exerted upon them, distorted from their normal relaxed condition, and are forced outwardly into the outer corners 66 (Figure 1) at the ends of the grooves 34 and 36, thus sealing off the space between the surfaces of the valve member and seat beyond the central zone thereof and closing off the relief openings which result from the relieving of these surfaces, as at 26 and 28 (Fig. 1).

With the construction described, it is possible to have the tapered surfcaes between the valve member and seat properly relieved, to avoid any shouldering of the surfaces when the valve member is preliminarily ground to fit the seat, yet, these relieved end areas are sealed off to preclude escape of fluid under pressure from the system being controlled, by the very act of inserting the valve member in its seat. The construction provides for increasing the effectiveness of the seal, by the distortion of the O-ring packings, under the applicaton of lubricant under pressure into the closed lubricant system, as described. When the lubricant ssytem is charged, as previously referred to, the distortion of the packing rings 38 and 40 results in a storing of energy therein, so that after the plug 65 is inserted into the port 62, and when the valve is installed and in service, the lubricant in the system is maintained under constant pressure by the energy stored in the packing rings 38 and 40.

In the charging of this valve with lubricant, no difficulty has been encountered due to the trapping of air in the lubricant system. In fact, the system may not be entirely filled with lubricant, and any air trapped therein and held under pressure will not impair the effectiveness of the end seals or the lubrication of the engaging surfaces.

When the valve member is initially installed, and the lubricant system is charged, the valve member will be customarily turned between opened and closed positions, and when this is done, the channels 60 are moved along the engaging surfaces of the valve seat in the central zone, to lubricate all surfaces thereof. The energy stored in the packing rings 38 and 40 maintains the lubricant under pressure in the channels 60, as they wipe across the engaging surfaces, to insure that the latter are covered with a thin film of lubricant. Any loss of energy stored in the packing rings, by reason of the initial wiping of the surfaces, may be restored when the valve is adjusted in open or closed position in the line, by further tightening of the charging plug 65 in the port 62, or by the adding of additional lubricant in the port, and subsequently tightening this plug. It will be understood that valves of the kind described are customarily left in the line over long periods of time, unattended, either in open or closed position. Even when the valve is moved between closed and open position, after being charged with lubricant, it is believed that not all of the pressure stored in the system is lost when a channel 60 moves across the open space presented by the ends of the passage 10. In operation, it appears that, depending on viscosity of the lubricant grease employed, there is only a local loss of pressure as the channels traverse the ends of the passage, when the valve member is quickly turned between open and closed positions. Of course, the pressure in the lubricant system may be completely restored, after the valve is turned, by tightening the plug 65 in the charging port 62.

The channels 60 are preferably machined in the outer surface of the valve member. They are very narrow, being in a 1½" size stop plug, approximately 3/64 of an inch wide, and approximately 5/64 of an inch in depth. When using such channels, of relatively small size, the lubricant grease in the entire system does not immediately respond to a particular application of pressure by tightening the plug in the charging port. That is, the charging plug can be set up tight, and then after a short interval of time, it may be further turned to compress the grease, during charging, indicating that the entire system does not immediately respond to the application of pressure. It is therefore probable that local exposure of the channels 60 during turning of the valve member results in only a local loss of pressure, rather than a loss of pressure throughout the entire system. In any event, when there is a loss of pressure by exposure of the channels due to turning of the valve member, same can be restored by tightening the charging plug or by forcing in additional lubricant grease with this plug.

By reason of the relatively small size of the channels 60, and the relatively small volume of the grooves left unfilled by the packing rings 38 and 40, a relatively small quantity of lubricant grease is employed to fill the system, yet the system is very effective in providing a valve structure sealed at the ends, and sealed by lubricant under pressure longitudinally of the valve member surrounding the port 30 and the body passage 10.

In the embodiment of Fig. 1, the packing rings are located at the inner terminations of the relieved portions 26 and 28. Of course, these relieved portions could extend inwardly beyond the rings, with the rings located outwardly of the inner terminations of these relieved portions to provide the necessary seal, while still positioning the packing rings around the major or principal tapered portion of the valve member.

In a broader sense, all of the sealing features of this valve structure are positioned within the longitudinal limits of the major portion or length of the valve member or plug. Of course, in a narrower sense, all of the sealing features of the invention, in the embodiment of Fig. 1, are formed in or provided upon the valve member. Thus, the valve body may be of generally conventional construction, requiring no machining of grooves therein, all of such work being performed upon the external surface of the valve member, where the surfaces are conveniently exposed for such machine operations. Of course, the invention would contemplate reversing or altering of the arrangement of the sealing parts on the respective members. Similarly, while the Fig. 1 embodiment discloses the use of the O-ring packings at both ends of the valve structure, the invention might be practiced to a more limited extent by providing such a sealing arrangement and enclosed lubricating system, at only one end of the structure, the opposite end being enclosed, or provided with any other well known form of sealing arrangement. It will be noted, however, that in the Fig. 1 embodiment, the valve structure may be of open construction at both ends, except for the provision of the seals around the principal or major part of the valve member, as described.

The end seals for the valve member are characterized by circumferential grooves extending around the major portion of the valve member, which grooves are filled by a deformed flexible sealing ring in the outer portions thereof, and with lubricant under pressure in the inner portions thereof. The construction eliminates the necessity for separate packing glands or threaded caps to compress the packing after the valve member is fixed in its engaging position within the body member. It will be observed that all of the engaging surfaces between the valve member and its seat are lubricated, and there are no metal to metal surfaces required at the ends of the valve structure, to maintain pressure in the enclosed system, as is usual in lubricated stop valves, the surfaces of the valve and body members presented to one another being relieved beyond the seals provided by the O-rings.

While the invention is most useful with the incorporation of a closed lubricant system as described, the packing rings would serve usefully as end seals in the absence of such a system or if such a system is not properly charged with grease. That is, any fluid from the line being controlled which might pass outwardly along the engaging surfaces would act upon and distort the packing rings in their grooves to sealing position or condition as described, and such fluid would thereby be prevented from escaping and would tend to tighten the end seals. Under such conditions, the relief openings beyond the packing rings would insure such a pressure differential on opposite sides of the rings, i. e., pipe line pressure against atmosphere, as would cause the packing rings to be self-sealing between the surfaces.

It has been suggested above that there may be variations in the design of the stop, while still practicing the invention, for instance, in the construction of the enclosed lubricant chamber and in the disposition of the packing ring and grooves.

Figure 21:
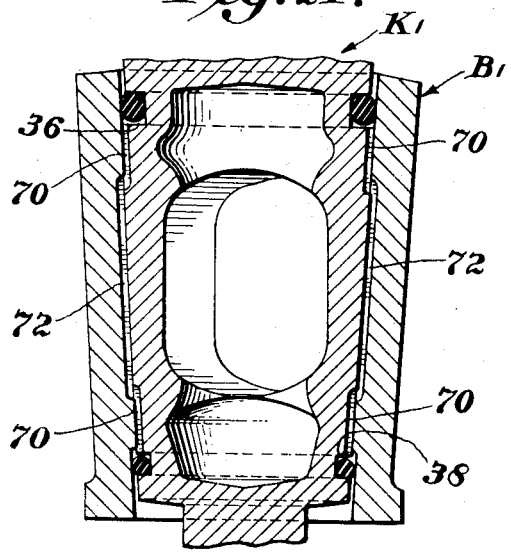
Fig. 21 is a vertical sectional view taken diagonally through the valve structure showing a slightly modified form of the invention.

In Fig. 21 a valve structure is disclosed, generally identical to that described above, except that there is a variation in the arrangement of the longitudinal lubricant channels, forming the enclosed lubricant system within the packing rings. The outer surface of the plug is provided with short longitudinally extending lubricant channels 70 which are spaced 90° from one another as in the case of channels 60 shown in Fig. 4. These channels only extend a short distance inwardly along the longitudinal length of the plug, where they terminate, rather than extending entirely between the packing grooves, as in the principal embodiment of the invention. When the valve member is in either one of its four positions (closed or open), the grooves 70 align with four longitudinal channels 72 in the surface of the valve body seat, the channels 72 being disposed 90° apart along each side of the passage 10 at each side of the valve. The channels 72 and 70 are designed to overlap one another at their ends as shown in Fig. 21. It will be understood that this valve body will have a charging port and plug, as described, and this plug may be positioned to communicate with one of the short channel sections 70 when the valve member is in any one of its closed or open positions, whereby the closed lubricant system may be charged, as described, with the resulting action and for the purposes described in connection with the principal embodiment of the invention. It will be understood that the valve and body members of this embodiment will be similarly relieved, outwardly of the packing grooves, as in the principal embodiment of the invention.

Of course, the illustrative modifications of Fig. 21 is intended to suggest various modifications of the arrangements of the lubricant channels and packing rings and grooves, and other obvious modifications may be employed, in carrying out the invention defined herein. For example, it would be possible to have the packing rings and grooves in the body, or a packing ring and groove at one end of the valve structure in the valve member, and to have the packing groove and ring at the opposite end of the valve structure, in the valve body. Similarly, it would be possible to have the packing grooves cut in one member and the longitudinal channels in the other member. However, the embodiment of Fig. 1, wherein all of the channels and grooves are in the same member, and particularly in the valve member, is preferred.

I claim:

1. A plug stop comprising: a body member having a flow passage extending therethrough and a circular opening extending laterally across said passage to constitute a plug seat; a valve plug rotatable in said seat and having a port alignable with said passage, the opposed surfaces of said seat and plug having sealing engagement for their major axial extents; means defining a circumferential packing groove in one of said surfaces adjacent each end of said seat; a resilient pressure-deformable packing ring in each of said grooves, each said ring when relaxed being non-complementary to the outer side wall of its corresponding groove, axially narrower than its corresponding groove, and of sufficient size in radial section to contact both the bottom of its corresponding groove and the other of said surfaces, said opposed surfaces being spaced apart slightly and out of contact axially outwardly of said rings; means for retaining said plug in sealing engagement with said seat; means for supplying lubricant under pressure in said grooves to deform their corresponding said rings against their outer side walls; and lubricant channel means extending between said opposed surfaces of said plug and seat and connecting said grooves to form a closed lubricant system.

2. The structure defined in claim 1 wherein the sealingly engaged portion of the opposed surfaces of plug and seat are tapered axially.

3. The structure defined in claim 1 wherein the sealingly engaged portions of the opposed surfaces of the plug and seat are tapered axially and wherein said plug is relieved at its larger end and said seat at its smaller end to space said opposed surfaces apart axially outwardly of the packing rings.

4. The structure defined in claim 1 wherein the packing rings are solid and normally circular in radial section.

5. The structure defined in claim 1 wherein the sealingly engaged portions of the opposed surfaces of the plug and seat are tapered axially and wherein the packing grooves are located in said plug.

6. The structure defined in claim 1 in which the means for retaining the plug in sealing engagement with the seat includes adjustable means for urging said plug into said seat while compressing the packing rings into their grooves until the opposed surfaces of said plug and seat are in sealing engagement.

7. A rotary plug stop comprising: a body member with a passage extending therethrough and a seat portion extending laterally across said passage; a valve member having a port therein for opening and closing said passage mounted for turning movement in said seat portion, said valve member having an exterior seating surface and said seat portion constituting a surrounding seating surface, said surfaces being formed to provide at least a central zone surrounding said port where they are substantially in contact with one another, one of said surfaces adjacent one end of said seat portion having a circumferential packing groove therein extending around said valve member; a resilient pressure-deformable packing ring in said groove, said ring when relaxed being non-complementary to the outer side wall of said groove and thicker in radial direction than the distance between the bottom of said groove and the other of said surfaces; means for retaining said valve member in said body member with said surfaces in said central zone substantially in contact with one another; means for supplying lubricant under pressure to said groove to deform said ring against said outer groove wall; lubricant channel means extending from said groove between said surfaces; and means for sealing the opposite end of said seat portion.

8. The structure defined in claim 7 wherein the surfaces outwardly beyond the groove are spaced apart and out of contact with one another.

9. The structure defined in claim 7 wherein the groove is of greater width than the packing ring to leave an annular lubricant space in said groove inwardly of said ring.

10. The structure defined in claim 7 in which the seating surfaces of the valve member and the seat portion are correspondingly tapered in the central zone and the groove and packing ring therein are located adjacent the small end of said valve member, and the retaining means includes adjustable means for urging said valve member into said seat portion while compressing said packing ring into said groove until the seating surfaces in the central zone are substantially in contact, and means for substantially locking said valve member in adjusted position in said seat portion against axial displacement therein during operation of the stop.

11. The structure defined in claim 10 in which the adjustable means includes a stem on the small end of the valve member, a locking ring on said stem bearing against the body member, and a nut threaded on said stem and bearing against said ring, and in which the locking means includes means substantially permanently fixing said ring to said stem.

12. The structure defined in claim 11 in which the fixing means comprises a pin extending transversely through said stem and at least partially into opposite sides of the ring.

13. A ground rotary plug stop for a conduit having fluid under pressure therein comprising: a body having a flow passage extending therethrough and a tapered seat portion extending laterally across said passage; a valve member for opening and closing said passage having a correspondingly tapered portion with a port therein mounted for turning movement in said seat portion, said valve member having an exterior seating surface and said seat portion constituting a surrounding seating surface, said surfaces having at least a central ground zone surrounding said port where they are substantially in contact with one another, one of said surfaces, adjacent each end of said seat portion, having a circumferential packing groove therein of substantially rectangular cross-section extending around said valve member; a pressure-deformable solid rubber packing ring of round cross-section in each of said grooves, the radial section diameter of each of said packing rings being less than the width of its groove and greater than the depth of its groove to protrude therefrom into contact with the other of said surfaces to thereby form a seal between said surfaces; lubricant channel means interrupting said surfaces in said central zone and connecting said grooves inwardly of said packing rings and forming therewith a closed lubricant system between said rings; and means for supplying lubricant under pressure to said system.

14. The structure defined in claim 13 in which the seating surfaces are spaced apart and out of contact with one another outwardly of the rings.

15. The structure defined in claim 13 including adjustable means for urging the valve member into the seat portion while compressing the packing rings into their grooves until the seating surfaces in the central zone are substantially in contact, and means for substantially locking said valve member in adjusted position in said seat portion against axial displacement therein during normal operation of the stop.

16. The structure defined in claim 15 in which the adjustable means includes a stem on the small end of the valve member, a locking ring on said stem bearing against the body, and a nut threaded on said stem and bearing against said ring, and in which the locking means includes means substantially permanently fixing said ring to said stem.

17. The structure defined in claim 16 in which the fixing means comprises a pin extending transversely through said stem and at least partially into opposite sides of the ring.

18. A rotary plug stop comprising: a body member with a passage extending therethrough and a seat portion extending laterally across said passage; a valve member having a port therein for opening and closing said passage mounted for turning movement in said seat portion, said valve member having an exterior seating surface and said seat portion constituting a surrounding seating surface, said surfaces being formed to provide at least a central zone surrounding said port where they are in sealing engagement with one another, one of said surfaces at one end of said central zone having a circumferential packing groove therein extending around said valve member; a resilient packing ring in said groove contacting both the bottom of said groove and the other of said surfaces, said surfaces being spaced apart outwardly beyond said ring; means for retaining said valve member in said body member with said surfaces in said central zone in sealing engagement; means for supplying lubricant under pressure to said groove at the inner side of said ring therein; lubricant channel means interrupting said surfaces and extending from said groove the entire length of said zone; and means for sealing the opposite end of said seat portion.

19. A plug stop comprising: a body member having a flow passage extending therethrough and a circular opening extending laterally across said passage to constitute a plug seat; a valve plug rotatable in said seat and having a port alignable with said passage, the opposed surfaces of said seat and plug having sealing engagement for their major axial extents; means defining a circumferential packing groove in one of said surfaces adjacent each end of said seat; a resilient pressure-deformable packing ring in each of said grooves contacting both the bottom thereof and the other of said surfaces, said surfaces being spaced apart outwardly beyond said rings; means for retaining said plug in sealing engagement with said seat; lubricant channel means interrupting said surfaces between said grooves and connecting the latter inwardly of said rings to form therewith a closed lubricant system; and means for supplying lubricant under pressure to said system.

FRANK H. MUELLER.

References Cited in the file of this patent

UNITED STATES PATENTS

| Number | Name | Date |
|---|---|---|
| 923,090 | Toback | May 25, 1909 |
| 1,892,835 | Hamer | Jan. 3, 1933 |
| 1,898,577 | Ford | Feb. 21, 1933 |
| 1,933,903 | Hamer | Nov. 7, 1933 |
| 2,011,113 | Neuhaus | Aug. 13, 1935 |
| 2,039,523 | Dopp et al. | May 5, 1936 |
| 2,070,899 | Hamer | Feb. 16, 1937 |
| 2,133,580 | Searle | Oct. 18, 1938 |
| 2,169,810 | Mueller | Aug. 15, 1939 |
| 2,216,150 | Wilkins | Oct. 1, 1940 |
| 2,229,932 | Parker | Jan. 28, 1941 |
| 2,328,857 | Stone | Sept. 7, 1943 |
| 2,342,664 | Haessler | Feb. 29, 1944 |
| 2,389,670 | Kerr et al. | Nov. 27, 1945 |
| 2,433,732 | Brown | Dec. 30, 1947 |
| 2,615,672 | Hinrichs | Oct. 28, 1952 |